United States Patent
Brown et al.

(10) Patent No.: US 11,018,606 B2
(45) Date of Patent: May 25, 2021

(54) LINEAR HALL EFFECT SENSORS FOR MULTI-PHASE PERMANENT MAGNET MOTORS WITH PWM DRIVE

(71) Applicant: Microchip Technology Incorporated, Chandler, AZ (US)

(72) Inventors: Ward R. Brown, Chandler, AZ (US); Howard Hendricks, Prescott, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 55 days.

(21) Appl. No.: 16/243,614

(22) Filed: Jan. 9, 2019

(65) Prior Publication Data
US 2019/0149071 A1 May 16, 2019

Related U.S. Application Data

(62) Division of application No. 15/278,291, filed on Sep. 28, 2016, now Pat. No. 10,135,369.

(60) Provisional application No. 62/234,458, filed on Sep. 29, 2015.

(51) Int. Cl.
*H02P 6/16* (2016.01)
*H02P 27/08* (2006.01)

(52) U.S. Cl.
CPC ............. *H02P 6/16* (2013.01); *H02P 27/08* (2013.01)

(58) Field of Classification Search
CPC .......... H02K 11/215; H02P 6/16; H02P 27/08
See application file for complete search history.

(56) References Cited

U.S. PATENT DOCUMENTS

| 3,707,638 | A | 12/1972 | Nailen ........................ 310/152 |
| 4,300,081 | A | 11/1981 | Van Landingham ......... 318/599 |
| 7,053,583 | B1 * | 5/2006 | Hazelton ................... H02P 6/16 |
| | | | 318/400.03 |
| 9,553,535 | B2 * | 1/2017 | Aoshima ................... H02P 8/06 |
| 2002/0030464 | A1 | 3/2002 | Okubo et al. ................. 318/727 |

(Continued)

FOREIGN PATENT DOCUMENTS

| CN | 103248293 A | 8/2013 | ................ H02P 6/08 |
| CN | 103715973 A | 4/2014 | .............. H02P 21/00 |

(Continued)

OTHER PUBLICATIONS

International Search Report and Written Opinion, Application No. PCT/US2016/054269, 11 pages, dated Jan. 17, 2017.
(Continued)

*Primary Examiner* — Bickey Dhakal
(74) *Attorney, Agent, or Firm* — Slayden Grubert Beard PLLC

(57) ABSTRACT

Low cost linear Hall Effect sensors are used for determining motor shaft positions and generating voltages proportional to the motor shaft positions. The voltages from the linear Hall Effect sensors are compared to a triangle waveform and PWM signals are generated therefrom. A constant current source and constant current sink are used in the triangle waveform generator. The voltages from the linear Hall Effect sensors are adjusted to change the PWM duty cycles used to startup and vary the speed of the motor. Comparators compare the voltages from the Hall Effect sensors and product the PWM signals having duty cycles proportional to the voltage drive requirements of the motor.

15 Claims, 6 Drawing Sheets

(56) References Cited

U.S. PATENT DOCUMENTS

| | | | |
|---|---|---|---|
| 2005/0001570 A1* | 1/2005 | Lee | H02P 6/28 |
| | | | 318/400.38 |
| 2005/0007045 A1 | 1/2005 | Kinukawa et al. | 318/400.22 |
| 2005/0200213 A1 | 9/2005 | Takeuchi | 310/68 B |
| 2005/0248306 A1 | 11/2005 | Chen et al. | 318/712 |
| 2008/0018295 A1* | 1/2008 | Jami | H02P 6/10 |
| | | | 318/799 |
| 2009/0153084 A1 | 6/2009 | Mishima et al. | 318/400.13 |
| 2013/0113400 A1* | 5/2013 | Kishimoto | H02P 6/188 |
| | | | 318/400.14 |
| 2014/0354271 A1* | 12/2014 | Kawase | G01D 5/2451 |
| | | | 324/207.25 |
| 2015/0214871 A1 | 7/2015 | Saglime, III | 318/430.32 |
| 2017/0343382 A1* | 11/2017 | Fukumura | H02P 6/16 |
| 2019/0319560 A1* | 10/2019 | Shi | H02P 6/17 |

FOREIGN PATENT DOCUMENTS

| | | | |
|---|---|---|---|
| CN | 104467603 A | 3/2015 | H02P 23/00 |
| EP | 0184860 A1 | 6/1986 | G01B 21/22 |
| EP | 2009781 A1 | 12/2008 | H02P 6/00 |

OTHER PUBLICATIONS

Chinese Office Action, Application No. 201680052306.9, 14 pages, dated Dec. 2, 2020.

* cited by examiner

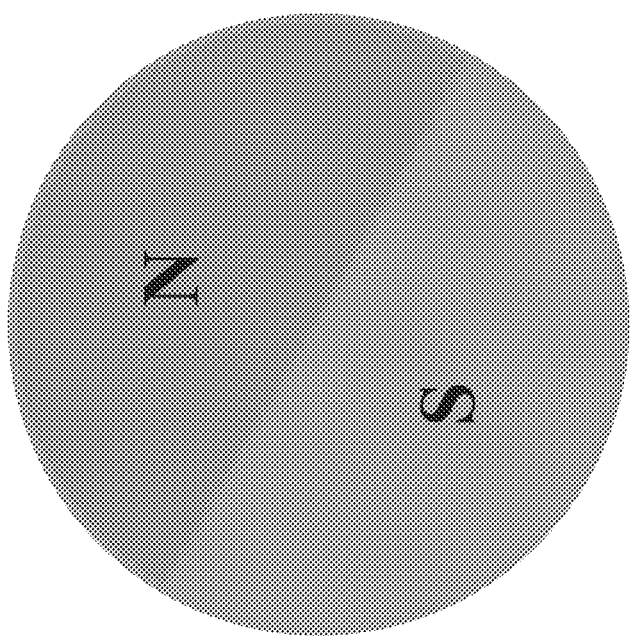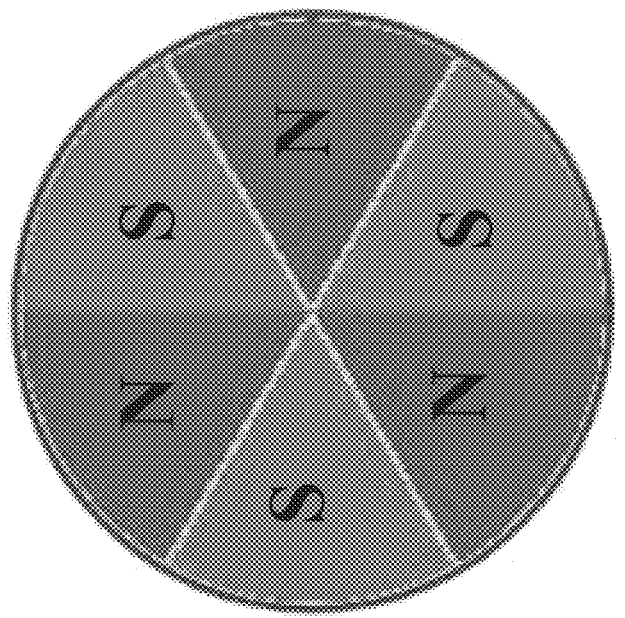
Figure 5

LINEAR HALL EFFECT SENSORS FOR MULTI-PHASE PERMANENT MAGNET MOTORS WITH PWM DRIVE

CROSS-REFERENCE TO RELATED APPLICATIONS

This application is a divisional of U.S. application Ser. No. 15/278,291 filed on Sep. 28, 2016; and claims priority to commonly owned U.S. Provisional Patent Application No. 62/234,458; filed Sep. 29, 2015, which are incorporated herein in their entirety.

RELATED PATENT APPLICATION

This application claims priority to commonly owned U.S. Provisional Patent Application No. 62/234,458; filed Sep. 29, 2015; which is hereby incorporated by reference herein for all purposes.

TECHNICAL FIELD

The present disclosure relates to brushless motors, and, in particular, pulse width modulation (PWM) drives for multi-phase brushless motors with linear Hall Effect sensors.

BACKGROUND

Permanent magnet motor commutation when determined by a digital processor and software program requires a significant amount of processing time. This is especially troublesome at high motor rotation speeds. Digital processors, e.g., microcontrollers, capable of performing the calculations quickly enough to determine commutation times are relatively expensive.

SUMMARY

Therefore a need exists for a way to commutate permanent magnet motors at high rotational speeds without requiring expensive and computationally complex digital processing.

According to an embodiment, a control circuit for use with a three phase permanent magnet motor may comprise three linear Hall Effect sensors arranged at a relative displacement of 120 degrees around a motor shaft with a magnet thereon, wherein voltage signals from the three linear Hall Effect sensors may be used to generate three pulse width modulation (PWM) signals adapted to rotate the motor in a clockwise or counterclockwise direction.

According to a further embodiment, the voltage signals from the three linear Hall Effect sensors may be compared with a triangular voltage waveform to generate the PWM signals. According to a further embodiment, duty cycles of the PWM signals may change as the voltage signals from the three linear Hall Effect sensors may be attenuated toward an average reference voltage. According to a further embodiment, an average reference voltage may be the sum of a highest peak voltage and a lowest trough voltage divided by two of a triangular voltage waveform. According to a further embodiment, a period of the PWM signals may be ⅕th or less than an electrical time constant (L/R) of the motor parameters. According to a further embodiment, the voltage signals from the three linear Hall Effect sensors may be used to determine an angular position of the rotating motor shaft. According to a further embodiment, the voltage signals from the three linear Hall Effect sensors may be used to remotely monitor an angular position of the motor shaft. According to a further embodiment, the magnet may comprise a central soft magnetic core and individual magnetic segments of Samarium magnet or Alnico material to enhance temperature stability of the magnetics. According to a further embodiment, a magnetic field of the magnet may be shaped to increase voltage output from the linear Hall Effect sensors. According to a further embodiment, the shaped magnetic field includes a fundamental plus a third harmonic at about ⅙ strength of the fundamental magnetic field.

According to another embodiment, a control circuit for use with a two phase permanent magnet motor may comprise two linear Hall Effect sensors arranged at a relative displacement of 90 degrees around a motor shaft with a magnet thereon, wherein voltage signals from the two linear Hall Effect sensors may be used to generate two pulse width modulation (PWM) signals adapted to rotate the motor in a clockwise or counterclockwise direction. According to a further embodiment, the voltage signals from the two linear Hall Effect sensors may be used to determine an angular position of the rotating motor shaft.

According to yet another embodiment, a control circuit for use with a multi-phase permanent magnet motor, may comprise a plurality of linear Hall Effect sensors arranged around a motor shaft with a magnet thereon, wherein voltage signals from the plurality of linear Hall Effect sensors may be used to generate a plurality of pulse width modulation (PWM) signals adapted to rotate the motor in a clockwise or counterclockwise direction. According to a further embodiment, the voltage signals from the plurality of linear Hall Effect sensors may be used to determine an angular position of the rotating motor shaft.

According to still another embodiment, a pulse width modulation (PWM) drive system for a three phase permanent magnet motor may comprise: three half-wave bridge power field effect transistor (FET) sets adapted for coupling to a three phase permanent magnet motor having a magnet on a rotor shaft thereof; three complementary output PWM drivers with dead-band control, having outputs coupled to respective ones of the three half-wave bridge power FET sets; first, second and third voltage comparators having outputs coupled to respective inputs of the three complementary output PWM drivers; first, second and third linear Hall Effect sensors adapted to be arranged around the three phase permanent magnet motor rotor shaft and spaced 120 degrees apart; first, second and third adjustable resistors, each having first, second and third terminals, wherein the first and third terminals may comprise the total resistance value of each adjustable resistor, and the second terminal may be adjustable in resistance between the first and third terminals; wherein the first terminals of the first, second and third adjustable resistors may be coupled to output voltages of respective ones of the first, second and third linear Hall Effect sensors, the second terminals of the first, second and third adjustable resistors may be coupled to non-inverting inputs of respective ones of the first, second and third voltage comparators, and the third terminals of the first, second and third adjustable resistors may be coupled to a third reference voltage from a third voltage reference; and a ramp generator having a triangle waveform output coupled to inverting inputs of the first, second and third voltage comparators; wherein PWM signals may be generated by the first, second and third voltage comparators, whereby the PWM signals have duty cycles dependent upon voltages from the second terminals of the first, second and third adjustable resistors.

According to a further embodiment, the ramp generator may comprise: a constant current source; a constant current sink; fourth and fifth voltage comparators having inverting inputs coupled to an output of the ramp generator; a first voltage reference providing a first reference voltage coupled to a non-inverting input of the fourth voltage comparator; and a second voltage reference providing a second reference voltage coupled to a non-inverting input of the fifth voltage comparator; wherein when a voltage on the output of the ramp generator may be equal to or greater than the second reference voltage then the constant current sink may be enabled, and when the voltage on the output of the ramp generator may be less than or equal to the first reference voltage then the constant current source may be enabled.

According to another embodiment, a pulse width modulation (PWM) drive system for a two phase permanent magnet motor may comprise: two half-wave bridge power field effect transistor (FET) sets adapted for coupling to a two phase permanent magnet motor having a magnet on a rotor shaft thereof; two complementary output PWM drivers with dead-band control, having outputs coupled to respective ones of the two half-wave bridge power FET sets; first and second voltage comparators having outputs coupled to respective inputs of the two complementary output PWM drivers; first and second linear Hall Effect sensors adapted to be arranged around the two phase permanent magnet motor rotor shaft and spaced 90 degrees apart; first and second adjustable resistors, each having first, second and third terminals, wherein the first and third terminals may comprise the total resistance value of each adjustable resistor, and the second terminal may be adjustable in resistance between the first and third terminals; wherein the first terminals of the first and second adjustable resistors may be coupled to output voltages of respective ones of the first and second linear Hall Effect sensors, the second terminals of the first and second adjustable resistors may be coupled to non-inverting inputs of respective ones of the first and second voltage comparators, and the third terminals of the first and second adjustable resistors may be coupled to a third reference voltage from a third voltage reference; and a ramp generator having a triangle waveform output coupled to inverting inputs of the first and second voltage comparators; wherein PWM signals may be generated by the first and second voltage comparators, whereby the PWM signals have duty cycles dependent upon voltages from the second terminals of the first and second adjustable resistors.

According to another embodiment, a method for generating pulse width modulation (PWM) drive for a three phase permanent magnet motor may comprise the steps of: providing a three phase permanent magnet motor with a rotatable motor shaft having a magnet thereon; providing three linear Hall Effect sensors arranged around the motor rotor shaft and spaced 120 degrees apart; generating voltages from the three linear Hall Effect sensors when the motor shaft having the magnet therewith rotates; comparing the voltages from the linear Hall Effect sensors with a triangular voltage waveform; generating three PWM signals from the comparison of the voltages from the linear Hall Effect sensors with the triangular voltage waveform; generating complementary PWM signals with dead-band control from the three PWM signals; driving three half-wave bridge power field effect transistors (FETs) with the complementary PWM signals with dead-band control; and coupling the three half-wave bridge power FETs to a power voltage source and to the three phase permanent magnet motor whereby PWM of the power voltage source cause the motor to rotate.

According to a further embodiment of the method, the voltages from the three linear Hall Effect sensors may be used to determine an angular position of the motor shaft. According to a further embodiment of the method, may further comprise the step of shaping a magnetic field of the magnet to increase voltage output from the linear Hall Effect sensors.

According to yet another embodiment, a method for generating pulse width modulation (PWM) drive for a two phase permanent magnet motor may comprise the steps of: providing a two phase permanent magnet motor with a rotatable motor shaft having a magnet thereon; providing two linear Hall Effect sensors arranged around the motor rotor shaft and spaced 90 degrees apart; generating voltages from the two linear Hall Effect sensors when the motor shaft having the magnet therewith rotates; comparing the voltages from the linear Hall Effect sensors with a triangular voltage waveform; generating two PWM signals from the comparison of the voltages from the linear Hall Effect sensors with the triangular voltage waveform; generating complementary PWM signals with dead-band control from the two PWM signals; driving two half-wave bridge power field effect transistors (FETs) with the complementary PWM signals with dead-band control; and coupling the two half-wave bridge power FETs to a power voltage source and to the two phase permanent magnet motor whereby PWM of the power voltage source cause the motor to rotate.

According to still another embodiment, a method for determining angular position of a motor shaft may comprise the steps of: providing a three phase permanent magnet motor having a rotatable motor shaft with a magnet thereon; providing first, second and third linear Hall Effect sensors, wherein the first, second and third linear Hall Effect sensors may be located around the motor shaft and spaced 120 degrees apart, whereby the second sensor rotationally lags the first sensor by 120 degrees and the third sensor rotationally lags the second sensor by 120 degrees; measuring maximum and minimum voltage values from the first linear Hall Effect sensor; saving the measured maximum and minimum voltage values, as MaxA and MinA, respectively; calculating a peak value as PeakA=(MaxA−MinA)/2; calculating an average value as AverageA=(MaxA+MinA)/2; measuring and saving output voltage values of the first, second and third linear Hall Effect sensors at an instant in time as MeasA, MeasB and MeasC, respectively; calculating SineA=(MaxA−AverageA)/PeakA; determining an Arcsine of SineA if SineA may be positive or the Arcsine of an absolute value of SineA if SineA may be negative and saving as ArcsineA; wherein if SineA may be positive and MeasC>MeasB then the angular position of the motor shaft may be ArcsineA, SineA may be positive and MeasB>MeasC then the angular position of the motor shaft may be 180−ArcsineA, SineA may be negative and MeasC>MeasB then the angular position of the motor shaft may be ArcsineA of the absolute value of SineA, and SineA may be negative and MeasB>MeasC then the angular position of the motor shaft may be 180−ArcsineA of the absolute value of SineA.

According to a further embodiment of the method, the step of determining the Arcsine of SineA or the absolute value of SineA may comprise the step of looking up the Arcsine of SineA or the absolute value of SineA from a table that may comprise a plurality of Sine to Arcsine values. According to a further embodiment of the method, the table of Sine to Arcsine values may be stored as a lookup table in a memory of a microcontroller. According to a further embodiment of the method, the table of Sine to Arcsine values from 0 to 90 degrees may be selected from the group consisting of 0.5, 1, 1.5, 2, 3, 4 and 5 degree increments. According to a further embodiment of the method, the step of determining an Arcsine may comprise the step of determining an Arcsine of the absolute value of SineA and saving as ArcsineA.

According to another embodiment, a method for determining angular position of a motor shaft may comprise the steps of: providing a three phase permanent magnet motor having a rotatable motor shaft with a magnet and a third harmonic magnet thereon; providing first, second and third linear Hall Effect sensors, wherein the first, second and third linear Hall Effect sensors may be located around the motor shaft and spaced 120 degrees apart, whereby the second sensor rotationally lags the first sensor by 120 degrees and the third sensor rotationally lags the second sensor by 120 degrees; measuring voltage values MeasA, MeasB and MeasC from the first, second and third linear Hall Effect sensors, respectively; calculating reconstructed voltage values MeasA'=MeasA−MeasB, MeasB'=MeasB+MeasC and MeasC'=MeasC+MeasA; determining maximum and minimum voltage values of MeasA' and saving as MaxA' and MinA', respectively; calculating a peak value as Peak'=(MaxA'+MinA')/2; calculating an average value as Average'=(MaxA'+MinA')/2; measuring and saving output magnitudes of the first, second and third linear Hall Effect sensors at an instant in time as MeasA, MeasB and MeasC, respectively; calculating SineA'=(MeasA'−Average')/Peak'; determining an Arcsine of SineA' if SineA' may be positive or the Arcsine of an absolute value of SineA' if SineA' may be negative and saving as ArcsineA; wherein if SineA' may be positive and MeasC'>MeasB' then the angular position of the motor shaft may be ArcsineA, SineA' may be positive and MeasB'>MeasC' then the angular position of the motor shaft may be 180−ArcsineA, SineA' may be negative and MeasC'>MeasB' then the angular position of the motor shaft may be ArcsineA of the absolute value of SineA', and SineA' may be negative and MeasB'>MeasC' then the angular position of the motor shaft may be 180−ArcsineA of the absolute value of SineA'.

According to a further embodiment of the method, the step of determining the Arcsine of SineA' or the absolute value of SineA' may comprise the step of looking up the Arcsine of SineA' or the absolute value of SineA' from a table that may comprise a plurality of Sine to Arcsine values. According to a further embodiment of the method, the table of Sine to Arcsine values may be stored as a lookup table in a memory of a microcontroller.

According to another embodiment, a method for determining angular position of a motor shaft may comprise the steps of: providing a two phase permanent magnet motor having a rotatable motor shaft with a magnet thereon; providing first and second linear Hall Effect sensors, wherein the first and second linear Hall Effect sensors may be located around the motor shaft and spaced 90 degrees apart, whereby the second sensor rotationally lags the first sensor by 90 degrees; measuring maximum and minimum voltage values from the first linear Hall Effect sensor; saving the measured maximum and minimum voltage values, as MaxA and MinA, respectively; calculating an average value as Average=(MaxA+MinA)/2; measuring and saving output voltage values of the first and second linear Hall Effect sensors at an instant in time as MeasA and MeasB, respectively; calculating A=(MaxA−Average), and B=(MaxB−Average); calculating TangentX=A divided by B wherein if TangentX and A may be positive then the angular position of the motor shaft may be the Arctangent of TangentX, TangentX may be negative and A may be positive then the angular position of the motor shaft may be 180 minus the Arctangent of the absolute value of TangentX, TangentX and A may be both negative then the angular position of the motor shaft may be the negative of the Arctangent of the absolute value of TangentX, and TangentX may be positive and A may be negative then the angular position of the motor shaft may be the negative of 180 minus the Arctangent of TangentX.

According to a further embodiment of the method, the step of determining the Arctangent of TangentX or the absolute value of TangentX may comprise the step of looking up the Arctangent of TangentX or the absolute value of TangentX from a table that may comprise a plurality of Tangent to Arctangent values. According to a further embodiment of the method, the table of Tangent to Arctangent values may be stored as a lookup table in a memory of a microcontroller.

BRIEF DESCRIPTION OF THE DRAWINGS

A more complete understanding of the present disclosure may be acquired by referring to the following description taken in conjunction with the accompanying drawings wherein:

FIG. 5 illustrates schematic diagrams of fundamental and third harmonic magnets, according to the teachings of this disclosure.

Figure 1:
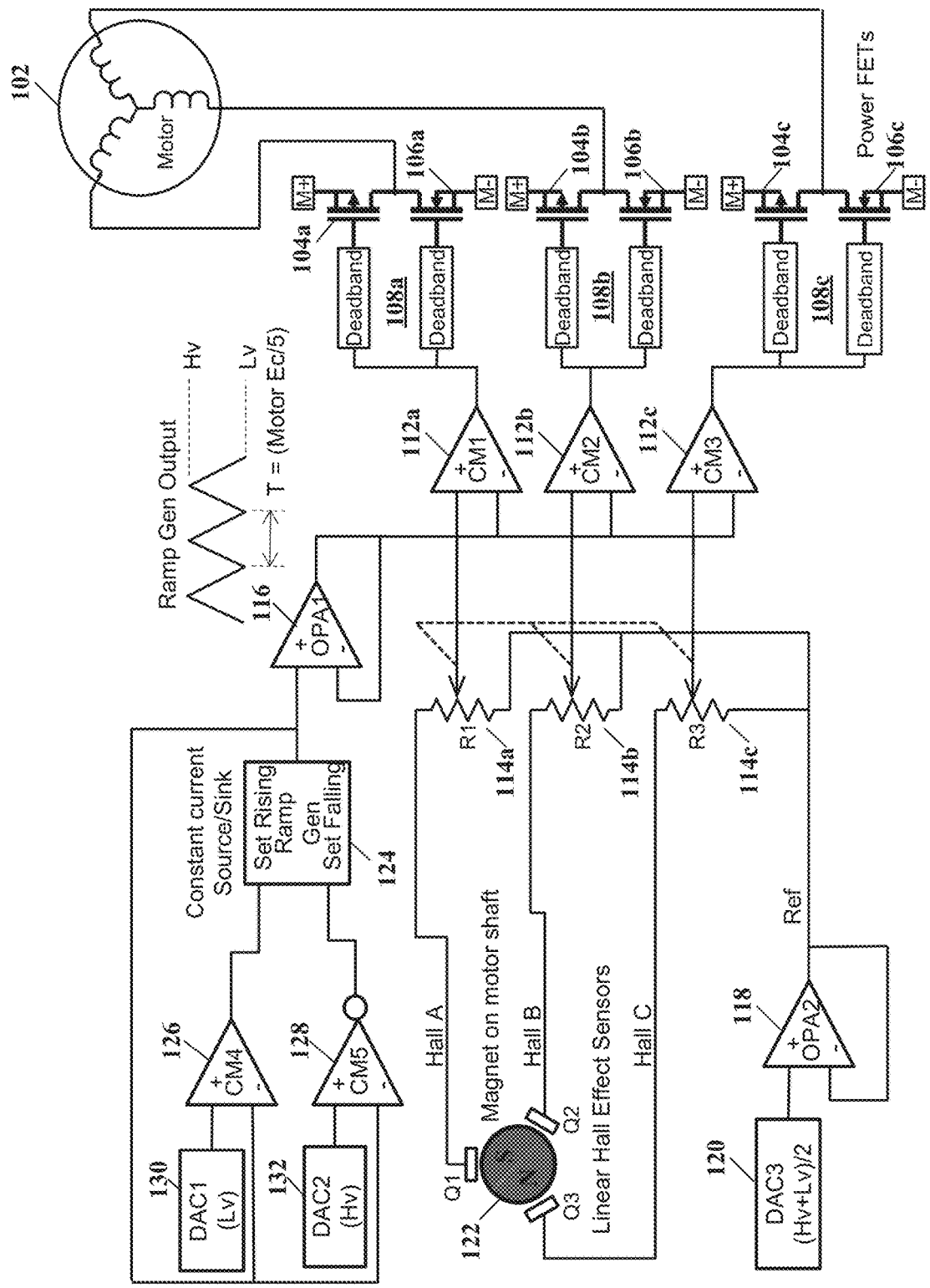
FIG. 1 illustrates a schematic block diagram of a three phase permanent magnet motor, linear Hall Effect sensors and associated motor PWM drive and commutation components, according to a specific example embodiment of this disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein.

DETAILED DESCRIPTION

The motor industry currently uses Hall Effect sensors to determine commutation information for brushless motors but this type of system has an error that cannot be eliminated. This is caused by the fact that it requires a larger level of magnetic flux to excite the Hall Effect sensor on then to turn the sensor off. This results in unequal signals when the Hall Effect sensor is in the zero mode then when it is in the one mode. A solution thereto presented hereinafter will resolve this error and be capable of supplying angular information for additional uses. Additionally there are circuits for developing sinusoidal currents using field orientation control but these require current sensing of the individual coil currents. The other problem that the brushless motor designs have is that using the conventional six step commutation scheme the commutation occurs at +/−30 degrees before and after the peak back electromotive force (BEMF) voltage is derived from the winding so there is a spike in the drive currents twelve (12) times during commutation of the motor.

Low cost linear Hall Effect sensors suitable for determining motor shaft position are relatively new. Also microcontrollers with all the required circuit functions are just now becoming available. Historically, the emphasis has been to eliminate the motor shaft position sensors to reduce cost but doing so requires more expensive digital processors and software programs. According to the various embodiments disclosed herein, this trend may be reversed by utilizing linear Hall Effect sensors in combination with a very low cost digital processor, e.g., microcontroller, having both analog and digital capabilities that may eliminate the aforementioned prior technology problems and all software program commutation processing requirements.

Referring now to the drawings, the details of example embodiments are schematically illustrated. Like elements in the drawings will be represented by like numbers, and similar elements will be represented by like numbers with a different lower case letter suffix.

Referring to FIG. 1, depicted is a schematic block diagram of a three phase permanent magnet motor, linear Hall Effect sensors and associated motor PWM drive and commutation components, according to a specific example embodiment of this disclosure. According to various embodiments, three linear Hall Effect sensors Q1, Q2 and Q3 may be used to determine angular position of a rotating shaft of a motor 102 by locating the linear Hall Effect sensors Q1, Q2 and Q3 at relative displacements from each other of 120 degrees electrical as shown in FIG. 1. The number of pole pairs determines the ratio of mechanical degrees to electrical degrees. For example, a motor with one pair of poles (two poles) has a ratio of 1 to 1. In other words it rotates one 360 degree mechanical revolution for each 360 degree electrical revolution. A motor with two pairs of poles (4 poles) has a ratio of 1 to 2 meaning it rotates one 360 degree mechanical revolution for every two electrical rotations or 720 degrees. A motor with three pole pairs (6 poles) has a ratio of 1:3, and so forth.

A magnet 122 is attached to the shaft of the motor 102 and is used to magnetically excite the three linear Hall Effect sensors Q1, Q2 and Q3. The rotational magnetic excitation of the Hall Effect sensors Q1, Q2 and Q3 provides a sinusoidal set of electrical signals (three) from these three sensors that is dependent on the relative position of the motor shaft angle, e.g., relationship of the magnetic flux from the magnet 122 exciting the Hall Effect sensors Q1, Q2 and Q3. The resultant sinusoidal signals may be used to determine the proper electrical commutation signals for an electrical permanent magnet synchronous motor, e.g., motor 102. These three generated sinusoidal signals are individually converted into pulse width modulated (PWM) signals sent to the motor coil drive power transistors 104 and 106, which have on and off pulse durations in a three phase relationship that provides the correct winding voltage requirements for the three phase permanent magnet synchronous motor, e.g., motor 102.

As stated above, three linear Hall Effect sensors Q1, Q2 and Q3 may provide a three-phase sinusoidal waveform in phase with each of the three phase voltages of the motor 102 when it is rotating (spinning). A signal from each Hall Effect sensor may be applied through a respective variable resistor 114, e.g., potentiometer—three terminal variable resistor, to a non-inverting input of a respective comparator 112, and a triangle waveform may be supplied by a ramp generator 124 to the inverting inputs of the comparators 112. The outputs of the three comparators 112 may drive three half-bridge power stages, e.g., power transistors 104 and 106 through complementary drivers having dead-band control 108. Each of the three half-bridge power stages 104 and 106 drive each winding of the motor 102 that correspond with the Hall Effect sensor that it is in phase with. Motor speed is controlled by adjusting the amplitude of the Hall Effect sensor outputs with the variable resistors 114. Motor direction may be reversed by inverting (not shown) the outputs of the comparators 112. The magnet 122 on the motor shaft provides the magnetic flux for the linear Hall Effect sensors Q1, Q2 and Q3 to detect. This magnet 122 may be either the motor rotor magnet or a separate magnet attached to the motor shaft (not shown).

The linear Hall Effect sensors Q1, Q2 and Q3 may be for example but are not limited to: Allegro A1324LUA-T. The linear Hall Effect sensor provides an output of a linear voltage proportional to a magnetic field is provided by an output from the linear Hall Effect sensor. In the presence of a magnetic field, e.g., magnet, rotating on the motor shaft the voltage output is a sine wave. The Hall Effect sensors Q1, Q2 and Q3 may be aligned with the motor magnet such that the Hall Effect sensor output voltage is in phase with the motor generated voltage, sometimes referred to as back electromotive force (BEMF).

The variable resistors 114 may be digitally programmable variable resistors controlled by a microcontroller (not shown). These variable resistors 114 may vary the voltage amplitude of the output signals from the Hall Effect sensors Q1, Q2 and Q3 coupled to the non-inverting inputs of the comparators 112. When the variable resistor 114 wipers (variable resistance center node) are fully towards the reference voltage from the buffer amplifier 118 then the comparator 112 outputs will be substantially a fifty percent (50%) duty cycle square wave. When the resistor 114 wipers are fully towards the voltages from the Hall Effect sensors Q1, Q2 and Q3 then the comparators 112 will output PWM signals with duty cycles proportional to the Hall Effect sensor Q1, Q2 and Q3 signal outputs.

A ramp generator 124 operates as a triangle wave generator. The ramp generator 124 may comprise a constant current source and constant current sink. Only one is active at a time. The constant current values may be adjustable thereby making the rising and falling ramp rates adjustable. The current values and trip points may be adjusted so that the triangle period is less than the motor electrical time constant.

Voltage comparators 126 and 128 may be used to change the direction of the voltage ramp from the ramp generator 124. When the ramp generator 124 output is at or above the reference voltage from the digital-to-analog converter (DAC) 132, then the ramp generator 124 current source is disabled and the current sink is enabled resulting in a falling ramp output. When the ramp generator 124 output is at or below the reference voltage from the DAC 130, then the ramp generator current sink is disabled and the current source is enabled resulting in a rising ramp output.

DACs 130 and 132 may be used to set the values at which the ramp generator 124 ramp output changes direction. Wherein DAC 130 sets the low voltage (Lv) value and DAC 132 sets the high voltage (Hv) value. An operational amplifier 116 may be used to buffer the ramp generator 124 output to the comparator 112 inverting-inputs. An operational amplifier 118 may be used to buffer the reference voltage to the adjustable (programmable) resistors 114. DAC 120 may be used to set this reference voltage. The voltage output from the DAC 120 may be adjusted so that the generated PWM duty cycle is fifty percent (50%) when the resistor 114 wipers are fully towards the reference voltage (Ref) from the output of the operational amplifier 118. The output voltage from the DAC 120 may be (Hv+Lv)/2.

Comparators 112 may be used to convert the Hall Effect sensor output voltages to PWM signals. The period of the PWM signals is set by the ramp generator 124 output present on the comparators 112 inverting inputs. The duty cycles of the PWM signals (three phases) are proportional to the Hall Effect sensor voltages present on the respective comparator non-inverting inputs.

Complementary drivers 108 having dead-band control may be used to convert the comparator 112 PWM outputs to complementary PWM signals having adjustable dead-bands (dead-band is when both outputs are off). A dead-band time is desired while transistor 104 turns off and transistor 106 turns on, or visa-versa. Dead-band time during the power transistor, e.g., power field effect transistors (FETs) 104 and 106 on and off transitions prevents the possibility of both the high and low side power FETs 104 and 106, respectively, from conducting at the same time (prevents shoot-through current).

The power FETs 104 and 106 convert the complementary PWM output voltages from the complementary drivers 108 to high voltage, high current motor voltages. When a permanent magnet motor 102 spins it generates a voltage that is proportional to the speed of the motor. The waveform of this generated voltage is determined by the motor construction and is usually sinusoidal, especially in the case of a permanent-magnet synchronous motor (PMSM) and usually is the case for a brushless direct current (BLDC) motor. This generated voltage phase lags the rotor magnetic poles by 90 electrical degrees. This offset is exactly what is needed when applying voltage to run the motor.

Figure 2:
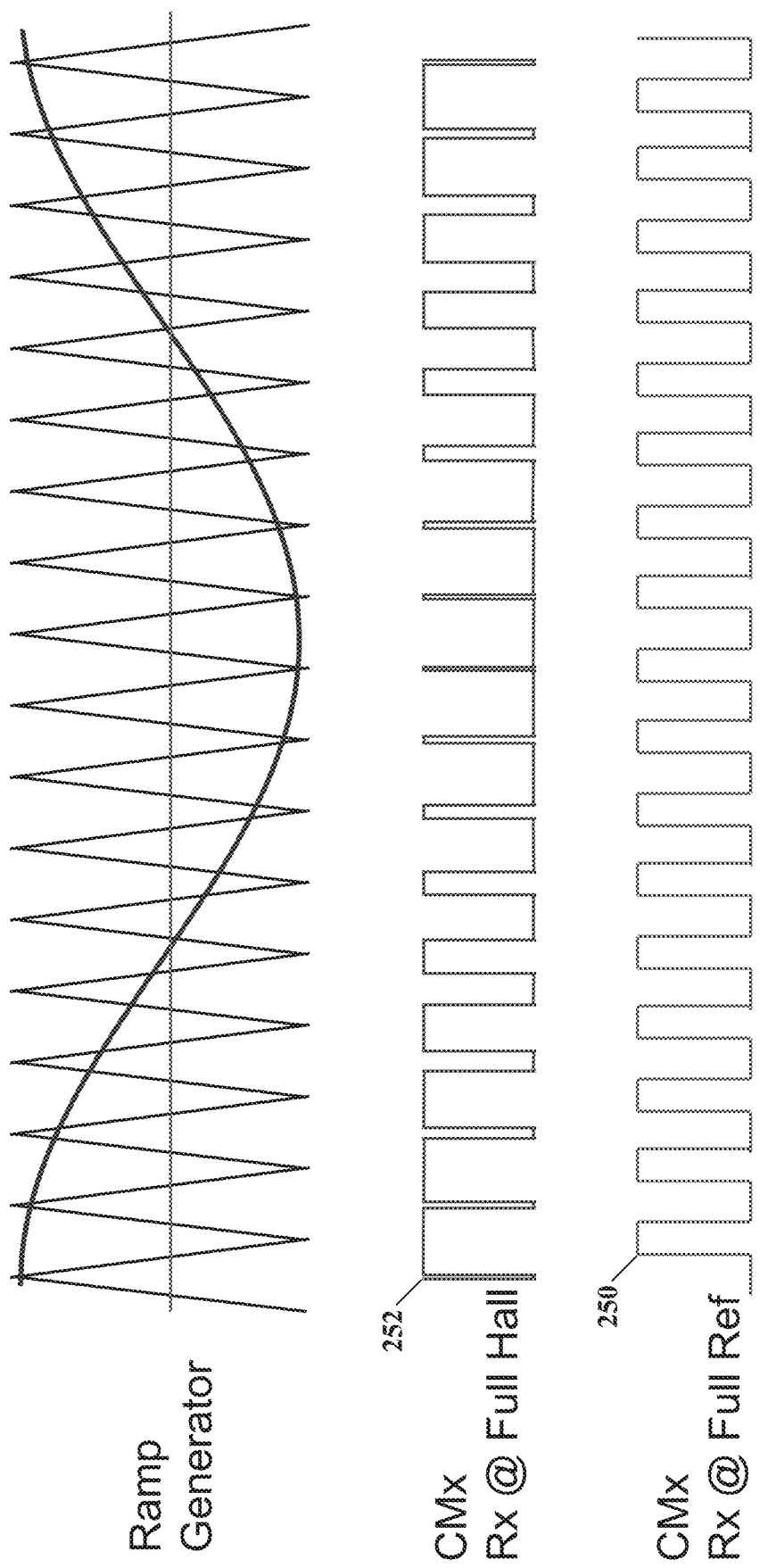
FIG. 2 illustrates schematic graphs of a linear Hall Effect sensor output and resulting PWM signals for a single phase of a motor over a range from full reference to full Hall Effect sensor output, according to the teachings of this disclosure.

When the variable resistor 114 wipers are all fully towards the reference voltage from the output of the operational amplifier 118, the voltage signals into the comparators 112 are constant at the reference voltage, and all three PWM duty cycles are at fifty percent (50%) as shown in FIG. 2 by the bottom voltage waveform 250. The resulting voltage difference across the motor terminals is zero so no current flows and the motor remains stationary. As the variable resistor 114 wipers are moved away from the reference voltage toward the respective voltages from the linear Hall Effect sensors Q1, Q2 and Q3, the voltage signal applied to the comparators 112 is the Hall Effect sensor output voltages attenuated by the variable resistors 114. Now the PWM duty cycle will vary according to the Hall Effect sensor voltages as shown in FIG. 2 by the middle voltage waveform 252.

Figure 6:
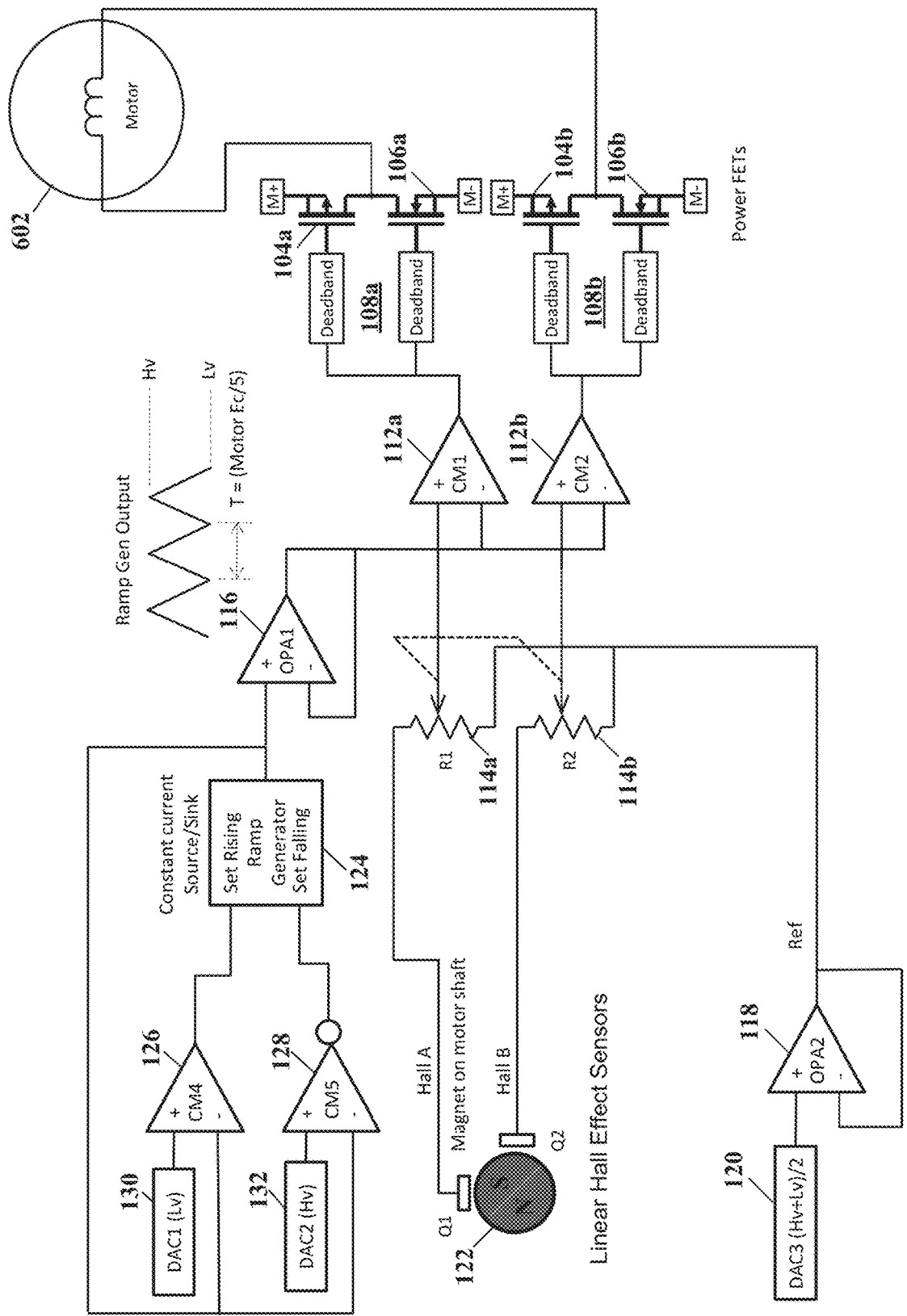
FIG. 6 illustrates a schematic block diagram of a two phase permanent magnet motor, linear Hall Effect sensors and associated motor PWM drive and commutation components, according to another specific example embodiment of this disclosure.

Referring to FIG. 6, depicted is a schematic block diagram of a two phase permanent magnet motor, linear Hall Effect sensors and associated motor PWM drive and commutation components, according to another specific example embodiment of this disclosure. This two phase permanent magnet motor embodiment functions in substantially the same way as the three phase two permanent magnet motor embodiment shown in FIG. 1 but with one less phase, wherein the two phases are 90 degrees apart instead of 120 degrees. Only two linear Hall Effect sensors Q1 and Q2, two adjustable (programmable) resistors 114, two comparators 112, and two pair of power transistors 104 and 106 through complementary drivers having dead-band control 108 are required.

Figure 3:
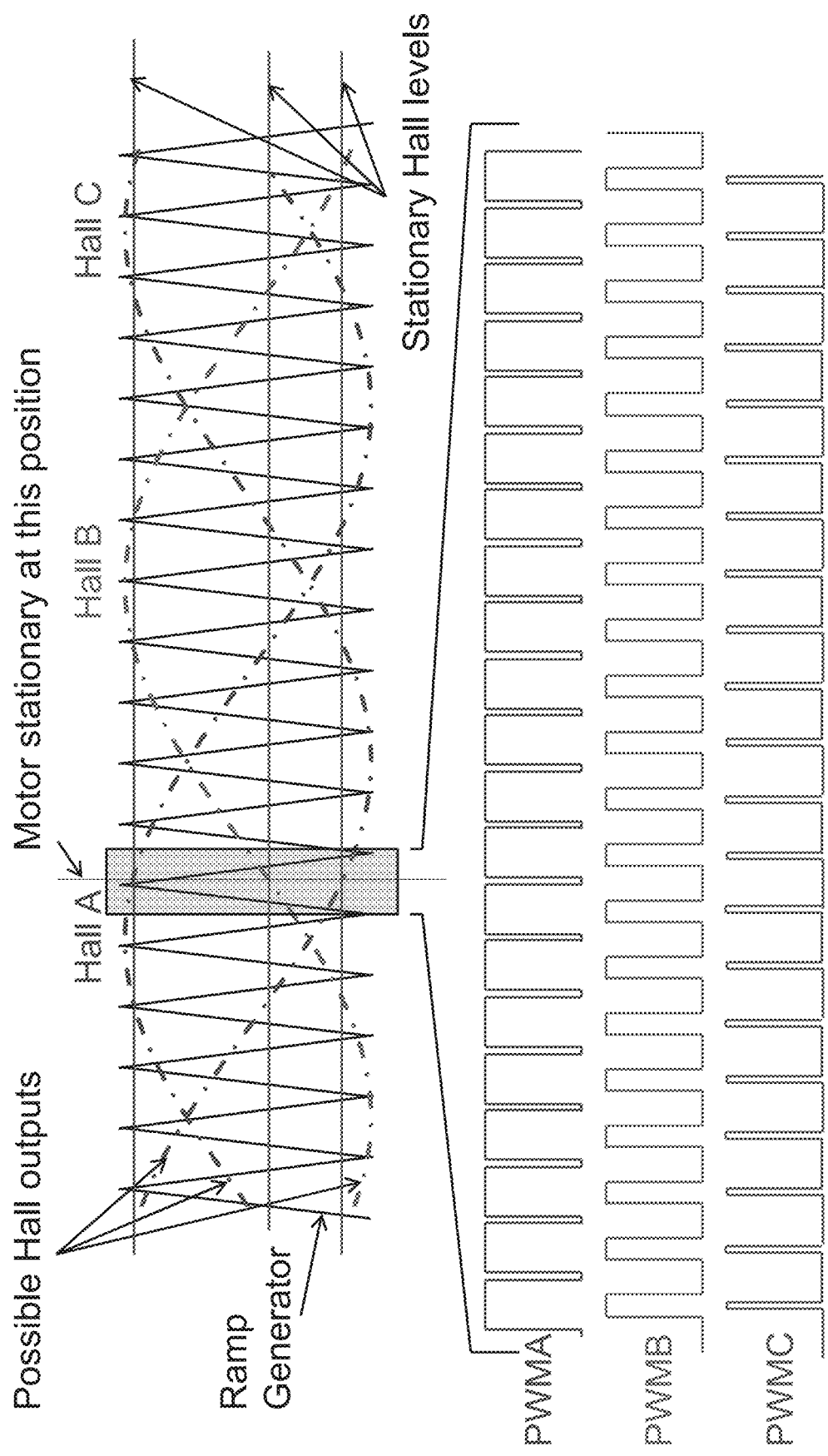
FIG. 3 illustrates schematic graphs of a plurality of linear Hall Effect sensor outputs and resulting PWM signals for a three phase motor, according to the teachings of this disclosure.

Referring now to FIG. 3, depicted are schematic graphs of a plurality of linear Hall Effect sensor outputs and resulting PWM signals for a three phase motor, according to the teachings of this disclosure. At startup the three PWM duty cycles create the three voltages at the motor phases that are 90 degrees from the motor rotator poles. FIG. 3 illustrates the full range of Hall Effect sensor output possibilities with the PWM duty cycles for one possibility selected. The three PWM waveform duty cycles shown in FIG. 3 are at full power to emphasize the differences between each PWM output. Actual startup would occur with the Hall Effect sensor outputs attenuated (with the variable resistors 114 to achieve only enough power and torque to rotate the motor 102.

The motor 102 is not turning at startup so the only impedance to the applied phase winding voltages are the motor winding resistances. In a permanent magnet motor torque is proportional to motor current. A current equal to the voltage difference between the motor phases, divided by the winding resistance, will flow causing the motor to rotate. As the motor 102 accelerates in response it generates a back EMF and the PWM inputs change in response to the Hall Effect sensors 114 keeping the applied voltage in phase with the motor generated voltage. The motor speed increases until the back EMF is equal to the applied voltage minus the resistive losses of the windings and other circuitry in the current path of each motor winding.

In a permanent magnet motor speed is proportional to the applied voltage. The more the variable resistor 114 wipers are moved towards the Hall Effect sensor 114 voltages, the higher the applied voltages are to the motor 102 and the faster the motor 102 spins. At every point in this response, from stationary to full speed, the applied voltages at the motor terminals are the required 90 degrees from the rotator poles.

Figure 4:
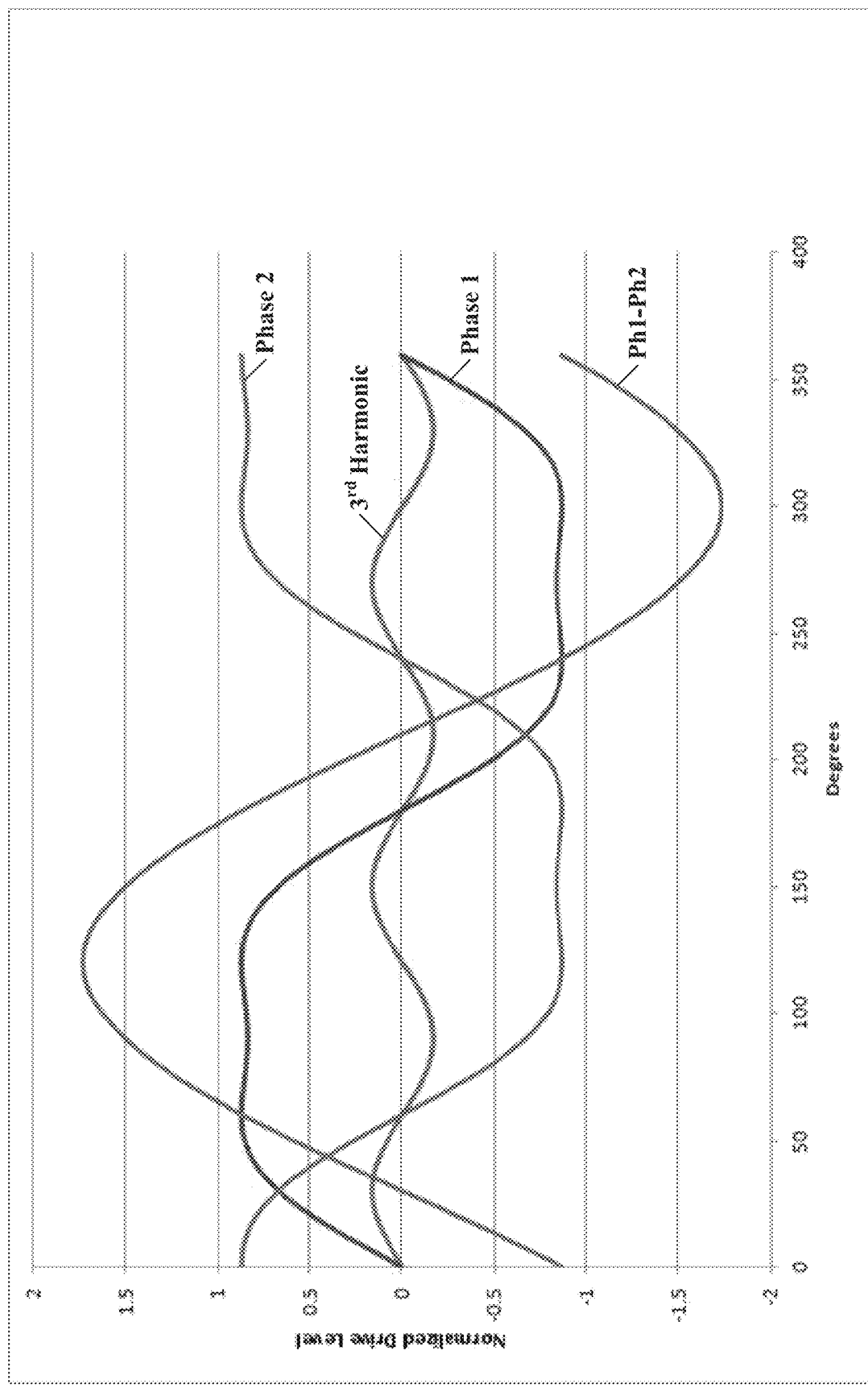
FIG. 4 illustrates schematic graphs of a plurality of linear Hall Effect sensors having shaped magnetic fields to improve performance thereof, according to the teachings of this disclosure.

Referring to FIG. 4, depicted are schematic graphs of a plurality of linear Hall Effect sensors having shaped magnetic fields to improve performance thereof, according to the teachings of this disclosure. Performance of the aforementioned embodiments can be enhanced by shaping the magnetic field applied to the Hall Effect sensors. The maximum voltage between motor terminals for an applied 3-phase sinusoidal waveform is 1.732 times the supply voltage. This can be boosted to 2 times the peak voltage by modifying the Hall Effect sensor magnets 122 to add a third harmonic to the otherwise sinusoidal waveform. A third harmonic at ⅙ the strength will suppress the peak by 0.866. The ramp generator peaks are lowered to correspond with the new peaks of the Hall Effect sensor waveform. The resulting Hall Effect sensor waveform is the fundamental plus the third harmonic. The difference between any two phases of the PWM output is sinusoidal with the peak increased by 1.15 resulting in a peak-to-peak drive level 2 times the motor supply level.

The third ($3^{rd}$) harmonic wave represents the third harmonic of the fundamental frequency at ⅙ the amplitude of the fundamental wave. The Phase 1 wave is the output of one of the Hall Effect sensors that represents the sum of the fundamental wave and the third harmonic wave. The Phase 2 wave is the output of a second Hall Effect sensor placed 120 electrical degrees from the Phase 1 wave Hall Effect sensor and also is the sum of the fundamental wave and the third harmonic wave placed 120 electrical degrees from the Phase 1 wave Hall Effect sensor. Since one period of the third harmonic wave is 120 electrical degrees the 120 electrical degree offset is not apparent. The Phase 1 wave minus Phase 2 wave (Ph1-Ph2 wave) is the difference between the Phase 1 wave and the Phase 2 wave. In other words, if you take every point of the Phase 1 wave and subtract the value of the Phase 2 wave at that same point in time the result is the value of the Ph1-Ph2 wave at that same point in time. This is easiest to verify at the points where the Phase 1 and Phase 2 waves cross and the Ph1-Ph2 wave value is zero. FIG. 4 shows only two of the three phases for simplicity. The third phase is 120 electrical degrees ahead of one of the two waves shown and 120 electrical degrees behind the other so the relationship between it and either of the two waves will be identical to that shown.

According to a further embodiment, a period of the pulse width modulator frequency may be $1/5^{th}$ or less than the electrical time constant (L/R) of the motor parameters (motor winding acts as a low pass filter to smooth the PWM pulses into a DC current).

The Clarke and Park transforms have been used in determining permanent magnet motor rotor position but these transforms are calculation intensive. A simpler method, according to a further embodiment, may use the three signals generated by the linear Hall Effect sensors Q1, Q2 and Q3 for remotely monitoring the angular position of a motor shaft, wherein phase B (sensor Q2) lags phase A (sensor Q1) by 120 degrees and phase C (sensor Q3) lags phase B (sensor Q2) by 120 degrees. Referring now to FIG. 3, let the Arcsine of the linear Hall Effect sensor A (Q1) input represent the angular position. A look-up table of one quadrant of Sine values may be used to determine the Arcsine in the range from 0 to 90 degrees. The number of values in the look-up table may determine the angular resolution. For example, for 5 degrees of resolution there are 19 Sine values in the look-up table which are the pre-calculated values of Sines from 0 to 90 degrees in 5 degree increments. It is contemplated and within the scope of this disclosure that other degree increments and fractions thereof may be used and are claimed herein, e.g., 0.5, 1, 1.5, 2, 3, 4, etc., and this Sine-to-Arcsine look-up table may be stored in a microcontroller memory (not shown).

The Arcsine of a Sine value is the table position containing the closest Sine value times the resolution. The Sine is calculated as follows: The maximum and minimum values of the Hall Effect sensor A may be measured and saved as MaxA and MinA. The Peak value of phase A is (MaxA−MinA)/2. The Average value of phase A is (MaxA+MinA)/2. The angular position at any instant in time may be determined by measuring and storing the three Hall Effect sensor output magnitudes at an instant in time. These sensor output magnitude measurements may be saved as variables MeasA, MeasB, and MeasC. The Sine of angle A is (MeasA−Average)/Peak. Let this value be SineA. If the SineA is positive and MeasC>MeasB then the angle is the direct result of finding the Arcsine of SineA from the look-up table. If SineA is positive and MeasB>MeasC then the angle is 180 degrees minus the look-up value. If SineA is negative and MeasC>MeasB then the absolute value of SineA is used to find the angle from the look-up table and the Arcsine is the negative of that angle. If SineA is negative and MeasB>MeasC then the absolute value of SineA is used to find the angle from the look-up table and the Arcsine is the negative of 180 minus that angle. In a similar fashion the Hall Effect sensor Q2 for phase B or the Hall Effect sensor Q3 for phase C may be used for the Arcsine lookup with all sensor output magnitude comparisons interchanged accordingly.

The aforementioned determination of motor rotor position may be used when the third harmonic magnet is not present. When the third harmonic magnet is present then the three sine wave voltages from the Hall Effect sensors should be mathematically reconstructed by finding the difference between pairs of these sensor output voltages. In other words, the three measurements used in the angle calculations would then be MeasA', MeasB' and MeasC' where MeasA'=MeasA−MeasB, MeasB'=MeasB−MeasC, and MeasC'=MeasC−MeasA. In this configuration the maximum and minimum values of the reconstructed sensor A (MeasA') may be measured and saved as MaxA' and MinA'. The Peak value of reconstructed phase A is Peak'=(MaxA'−MinA')/2. The Average value of reconstructed phase A is Average'=(MaxA'+MinA')/2. The angle obtained by using the reconstructed measurements, let's call this angle A', lags the angle that would have been obtained without the third harmonic magnet by 30 electrical degrees. The Sine of angle A' is (MeasA'−Average')/Peak'. Let this value be SineA'. If the SineA' is positive and MeasC'>MeasB' then the angle is the direct result of finding the Arcsine of SineA' from the look-up table. If SineA' is positive and MeasB'>MeasC' then the angle is 180 degrees minus the look-up value. If SineA' is negative and MeasC'>MeasB' then the absolute value of SineA' is used to find the angle from the look-up table and the Arcsine is the negative of that angle. If SineA' is negative and MeasB'>MeasC' then the absolute value of SineA' is used to find the angle from the look-up table and the Arcsine is the negative of 180 minus that angle. In a similar fashion SineB' derived from MeasB' or SineC' derived from MeasC' may be used for the Arcsine lookup with all sensor output magnitude comparisons interchanged accordingly.

Referring now to FIG. 6, let the Arctangent of the Sine of linear Hall Effect sensor A (Q1) divided by the Cosine of linear Hall Effect sensor B (Q2) represent the angular position of a two phase configuration. A look-up table of one quadrant of Tangent values may be used to determine the Arctangent in the range from 0 to 90 degrees. The maximum and minimum values of the Hall Effect sensor A may be measured and saved as MaxA and MinA. The Average value of phase A is (MaxA+MinA)/2. The maximum and minimum values of phase B equal those of phase A by design. Therefore, the Average value of phase B equals the Average value of phase A. Since Hall Sensor B leads Hall Sensor A by 90 degrees, Hall Sensor B represents the Cosine of the angle and Hall Sensor A represents the Sine of the angle. The Tangent of the angle is Sine/Cosine. The angular position, X, at any instant in time may be determined by measuring and storing the two Hall Effect sensor output magnitudes at an instant in time. These sensor output magnitude measurements may be saved as variables MeasA, and MeasB. The Sine of angle X is (MeasA−Average)/Peak. Let this value be SineX. The Cosine of angle X is (MeasB−Average)/Peak. Let this value be CosineX. The Tangent of angle X is SineX/CosineX. Let this value be TangentX. The Peak values cancel out and need not be calculated. Therefore, TangentX is equal to (MeasA−Average) divided by (MeasB−Average). If the TangentX is positive and SineX is positive then the angle X is the direct result of finding the Arctangent of TangentX from the look-up table. If TangentX is negative and SineX is positive then the absolute value of TangentX is used to find the angle from the look-up table and the angle X is 180 degrees minus that value. If TangentX is negative and SineX is negative then the absolute value of TangentX is used to find the angle from the look-up table and the Arctangent of X is the negative of that angle. If TangentX is positive and SineX is negative then the value of TangentX is used to find the angle from the look-up table and the Arctangent of X is the negative of 180 minus that angle. The third harmonic magnet cannot be used in the two phase configuration.

According to a further embodiment, the exciting magnet assembly may comprise a central soft magnetic core and individual magnetic segments of Samarium magnet or Alnico material to enhance the temperature stability of the magnetic circuit because the flux intensity of neodymium and ceramic has a negative temperature coefficient of 0.11%/° C. versus 0.025%/° C. for Samarium Cobalt and 0.01%/° C. for Alnico magnet materials resulting in proportionately less variance of speed over temperature.

Referring to FIG. 5, depicted are schematic diagrams of fundamental and third harmonic magnets, according to the teachings of this disclosure. FIG. 5(a) shows a fundamental and FIG. 5(b) a third harmonic magnet. When these two magnetic sources are superimposed on each other the aggregate magnetic field will produce the Phase 1 wave and Phase 2 wave Hall Effect sensor output responses as shown in FIG. 4.

The invention claimed is:

1. A method for determining angular position of a rotatable motor shaft, said method comprising the steps of:
   providing a three phase permanent magnet motor having the rotatable motor shaft with a magnet thereon;
   providing first, second and third linear Hall Effect sensors, wherein the first, second and third linear Hall Effect sensors are located around the motor shaft and spaced 120 degrees apart, whereby the second sensor rotationally lags the first sensor by 120 degrees and the third sensor rotationally lags the second sensor by 120 degrees;
   controlling the three phase permanent magnet motor by three pulse width modulated (PWM) signals, wherein the first PWM signal is generated using a voltage received from the first linear Hall Effect sensor, the second PWM signal is generated using a voltage received from the second linear Hall Effect sensor, and the third PWM signal is generated using a voltage received from the third linear Hall Effect sensor;
   attenuating the voltages received from the first, second, and third Hall Effect sensor to rotate the motor;
   providing a microcontroller which continuously receives the voltages from the first, second and third linear Hall Effect sensors to determine maximum and minimum voltage values from the first linear Hall Effect sensor;
   wherein the microcontroller is further configured:
   to save the determined maximum and minimum voltage values, as MaxA and MinA, respectively;
   to calculate a peak value as PeakA=(MaxA−MinA)/2;
   to calculate an average value as AverageA=(MaxA+MinA)/2;
   wherein to determine the angular position of the motor shaft at any instant in time, the microcontroller is configured:
   to measure and save output voltage values of the first, second and third linear Hall Effect sensors at an instant in time as MeasA, MeasB and MeasC, respectively;
   to calculate SineA=(MeasA−AverageA)/PeakA;
   to determine an Arcsine of SineA if SineA is positive or the Arcsine of an absolute value of SineA if SineA is negative and saving as ArcsineA;
   wherein if
   SineA is positive and MeasC>MeasB then the angular position of the motor shaft is ArcsineA,
   SineA is positive and MeasB>MeasC then the angular position of the motor shaft is 180−ArcsineA,
   SineA is negative and MeasC>MeasB then the angular position of the motor shaft is ArcsineA of the absolute value of SineA, and
   SineA is negative and MeasB>MeasC then the angular position of the motor shaft is 180−ArcsineA of the absolute value of SineA.

2. The method according to claim 1, wherein the step of determining the Arcsine of SineA or the absolute value of SineA comprises the step of looking up the Arcsine of SineA or the absolute value of SineA from a table comprising a plurality of Sine to Arcsine values.

3. The method according to claim 2, wherein the table of Sine to Arcsine values is stored as a lookup table in a memory of the microcontroller.

4. The method according to claim 3, wherein the table of Sine to Arcsine values from 0 to 90 degrees is selected from the group consisting of 0.5, 1, 1.5, 2, 3, 4 and 5 degree increments.

5. The method according to claim 1, wherein the step of determining an Arcsine comprises the step of determining an Arcsine of the absolute value of SineA and saving as ArcsineA.

6. The method according to claim 1, wherein a first Hall Effect sensor magnet and a second Hall Effect sensor magnet are arranged around the motor shaft, wherein the second Hall Effect magnet has ⅙ the strength of the first Hall Effect sensor magnet and is arranged with respect to the first Hall Effect sensor magnet to generate a third harmonic of a fundamental frequency suppressing a peak of a Hall Effect sensor signal.

7. The method according to claim 1, wherein a first Hall Effect sensor magnet and a second Hall Effect sensor magnet are arranged around the motor shaft, wherein the first Hall Effect sensor magnet comprises a first and second half, wherein the first half is a north pole and the second half is a south pole and a secondHall Effect magnet comprising six alternating north pole and south pole sections to generate a third harmonic of a fundamental frequency suppressing a peak of a Hall Effect sensor signal.

8. A method for determining angular position of a rotatable motor shaft, said method comprising the steps of:
   providing a three phase permanent magnet motor having the rotatable motor shaft with a magnet and a third harmonic magnet thereon;
   providing first, second and third linear Hall Effect sensors, wherein the first, second and third linear Hall Effect sensors are located around the motor shaft and spaced 120 degrees apart, whereby the second sensor rotationally lags the first sensor by 120 degrees and the third sensor rotationally lags the second sensor by 120 degrees;
   controlling the three phase permanent magnet motor by three pulse width modulated (PWM) signals, wherein the first PWM signal is generated using a voltage received from the first linear Hall Effect sensor, the second PWM signal is generated using a voltage received from the second linear Hall Effect sensor, and the third PWM signal is generated using a voltage received from the third linear Hall Effect sensor;
   attenuating the voltages received from the first, second, and third Hall Effect sensor to rotate the motor;

measuring voltage values MeasA, MeasB and MeasC from the first, second and third linear Hall Effect sensors, respectively;

calculating reconstructed voltage values MeasA'=MeasA−MeasB, MeasB'=MeasB−MeasC and MeasC'=MeasC−MeasA;

determining maximum and minimum voltage values of MeasA' and saving as MaxA' and MinA', respectively;

calculating a peak value as Peak'=(MaxA'−MinA')/2;

calculating an average value as Average'=(MaxA'+MinA')/2;

measuring and saving output magnitudes of the first, second and third linear Hall Effect sensors at an instant in time as MeasA, MeasB and MeasC, respectively;

calculating SineA'=(MeasA'−Average')/Peak';

determining an Arcsine of SineA' if SineA' is positive or the Arcsine of an absolute value of SineA' if SineA' is negative and saving as ArcsineA;

wherein if
  SineA' is positive and MeasC'>MeasB' then the angular position of the motor shaft is ArcsineA,
  SineA' is positive and MeasB'>MeasC' then the angular position of the motor shaft is 180−ArcsineA,
  SineA' is negative and MeasC'>MeasB' then the angular position of the motor shaft is ArcsineA of the absolute value of SineA', and
  SineA' is negative and MeasB'>MeasC' then the angular position of the motor shaft is 180−ArcsineA of the absolute value of SineA'.

9. The method according to claim 8, wherein the step of determining the Arcsine of SineA' or the absolute value of SineA' comprises the step of looking up the Arcsine of SineA' or the absolute value of SineA' from a table comprising a plurality of Sine to Arcsine values.

10. The method according to claim 9, wherein the table of Sine to Arcsine values is stored as a lookup table in a memory of a microcontroller.

11. A method for determining angular position of a rotatable motor shaft, said method comprising the steps of:
  providing a two phase permanent magnet motor having the rotatable motor shaft with a magnet thereon;
  providing first and second linear Hall Effect sensors, wherein the first and second linear Hall Effect sensors are located around the motor shaft and spaced 90 degrees apart, whereby the second sensor rotationally lags the first sensor by 90 degrees;
  controlling the two phase permanent magnet motor by two pulse width modulated (PWM) signals, wherein the first PWM signal is generated using a voltage received from the first linear Hall Effect sensor and the second PWM signal is generated using a voltage received from the second linear Hall Effect sensor;
  attenuating the voltages received from the first, second, and third Hall Effect sensor to rotate the motor;
  measuring maximum and minimum voltage values from the first linear Hall Effect sensor;
  saving the measured maximum and minimum voltage values, as MaxA and MinA, respectively;
  calculating an average value as Average=(MaxA+MinA)/2;
  measuring and saving output voltage values of the first and second linear Hall Effect sensors at an instant in time as MeasA and MeasB, respectively;
  calculating A=(MaxA−Average), and B=(MaxB−Average);
  calculating TangentX=A divided by B wherein if
  TangentX and A are positive then the angular position of the motor shaft is the Arctangent of TangentX,
  TangentX is negative and A is positive then the angular position of the motor shaft is 180 minus the Arctangent of the absolute value of TangentX,
  TangentX and A are both negative then the angular position of the motor shaft is the negative of the Arctangent of the absolute value of TangentX, and
  TangentX is positive and A is negative then the angular position of the motor shaft is the negative of 180 minus the Arctangent of TangentX.

12. The method according to claim 11, wherein the step of determining the Arctangent of TangentX or the absolute value of TangentX comprises the step of looking up the Arctangent of TangentX or the absolute value of TangentX from a table comprising a plurality of Tangent to Arctangent values.

13. The method according to claim 12, wherein the table of Tangent to Arctangent values is stored as a lookup table in a memory of a microcontroller.

14. The method according to claim 11, wherein a first Hall Effect sensor magnet and a second Hall Effect sensor magnet are arranged around the motor shaft, wherein the second Hall Effect magnet has ⅙ the strength of the first Hall Effect sensor magnet and is arranged with respect to the first Hall Effect sensor magnet to generate a third harmonic of a fundamental frequency suppressing a peak of a Hall Effect sensor signal.

15. The method according to claim 11, wherein a first Hall Effect sensor magnet and a second Hall Effect sensor magnet are arranged around the motor shaft, wherein the first Hall Effect sensor magnet comprises a first and second half, wherein the first half is a north pole and the second half is a south pole and a secondHall Effect magnet comprising six alternating north pole and south pole sections to generate a third harmonic of a fundamental frequency suppressing a peak of a Hall Effect sensor signal.

\* \* \* \* \*